United States Patent Office.

BERNARD BATTLE, OF PITTSBURG, PENNSYLVANIA, ASSIGNOR TO DANIEL COYLE, OF SOHO, PENNSYLVANIA.

Letters Patent No. 60,989, dated January 8, 1867.

IMPROVED COMPOSITION FOR LUBRICATING JOURNALS.

The Schedule referred to in these Letters Patent and making part of the same.

TO ALL WHOM IT MAY CONCERN:

Be it known that I, BERNARD BATTLE, of Pittsburg, in the county of Allegheny, and State of Pennsylvania, have invented a new and useful Composition for Lubricating Journals; and I do hereby declare the following to be a full, clear, and exact description thereof.

In rolling-mills or other establishments where it is necessary to use hot rolls, or where the rolls necessarily become heated from constant or frequent contact with heated metals, or where the journals of rolls or other machinery are liable to become heated from friction or other causes, it is desirable to employ a lubricator for the journals when heated, which is more capable of resisting the decomposing action of heat than the ordinary oils or oleaginous compounds. The nature of my invention consists in compounding a lubricator adapted to such uses.

To enable others skilled in the art to manufacture my improved lubricator, I will proceed to describe my mode of compounding or preparing it.

For the principal ingredient of my composition I employ any kind of animal grease or the remains of the distillation of hydro-carbon oils, commonly called "residuum." Whichever is used I subject it in any desirable quantity to the action of heat sufficient to raise its temperature to, or near to, the boiling point of such material. While in a liquid state I mix with it, in about the proportions hereinafter designated, the following-named articles, to wit: graphite or plumbago, commonly known as black lead; sulphur, usually pulverized or sublimated; steatite, commonly known as French chalk or soap-stone; rosin, carbonate of magnesia, glue, hydrate of lime, and molasses. While mixing, and afterwards, I stir the compound slowly and keep it subject to the action of heat, at or near its boiling point, for about one hour. I then allow it to cool, when it is ready for use. The last-named article, molasses, may, however, be dispensed with, as it is not a necessary ingredient in my improved lubricating compound.

The proportions in which I usually mix the above-named ingredients are substantially as follows: for every barrel of animal grease or "residuum," I use of plumbago, sulphur, and steatite, two pounds each; of carbonate of magnesia, glue, and rosin, one pound each; of hydrate of lime, one-half peck; and of molasses, when used, one-half gallon; and less quantities in the same proportions, varying sometimes to a slight degree, the relative proportions of the ingredients named, according to the quality of the grease or "residuum" employed, the object in view being to secure a mixture adapted for use as a lubricator, and still capable of resisting the action of heat. And by my invention these ends are secured to a greater degree than by most, if by any, of the lubricating compounds now in general use.

I do not limit myself to the use of the composition described on heated journals alone, since it is well adapted for use on cold journals, particularly such as are liable to become heated by rapidity of motion or from other causes. I claim it also of great practical utility on the journals of heavy machinery, whether heated or not, where the friction is considerable. A lubricator is then desired, possessing a body less liable to the erosive effects of friction than is generally the case with lubricating oils, and such use I include in my invention.

Hence, what I claim as my invention, and desire to secure by Letters Patent, is—

The preparation of a lubricating compound composed of the above-named ingredients, viz, animal grease or "residuum," plumbago, sulphur, steatite, carbonate of magnesia, glue, rosin, and hydrate of lime, with or without molasses, substantially as above set forth, and in the proportions and for the purposes above designated.

In testimony whereof, I, the said BERNARD BATTLE, have hereunto set my hand in presence of—

BERNARD BATTLE.

Witnesses:
W. D. LEWIS,
A. S. NICHOLSON.